Figure 1:
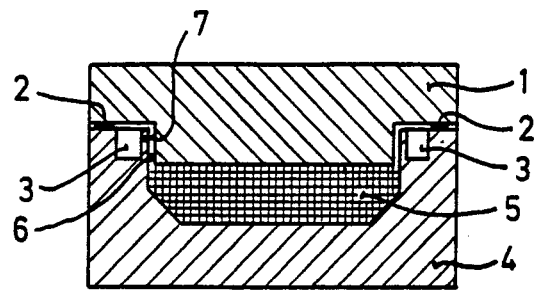

United States Patent [19]

Wallner et al.

[11] Patent Number: 4,555,087
[45] Date of Patent: Nov. 26, 1985

[54] SPLIT MOLD FOR MULTI-COMPONENT PLASTICS, ESPECIALLY POLYURETHANES

[75] Inventors: Josef Wallner, Holzkirchen; Manfred Kelterbaum, Strasslach, both of Fed. Rep. of Germany

[73] Assignee: Elastogran Maschinenbau GmbH, Strasslach, Fed. Rep. of Germany

[21] Appl. No.: 592,713

[22] Filed: Mar. 23, 1984

[30] Foreign Application Priority Data

Mar. 24, 1983 [DE] Fed. Rep. of Germany ....... 3310677

[51] Int. Cl.⁴ ............................ B29C 1/00; B29G 1/00
[52] U.S. Cl. ..................................... 249/78; 425/4 R
[58] Field of Search ................ 164/305, 410; 425/812, 425/4 R, 547, 817 R; 249/78

[56] References Cited

U.S. PATENT DOCUMENTS

| 2,304,461 | 12/1942 | Knowles | 425/812 |
| 3,337,911 | 8/1967 | Settembrini | 425/812 |
| 3,349,833 | 10/1967 | Holder | 425/812 |
| 4,314,765 | 2/1982 | Hotz | 425/812 |

FOREIGN PATENT DOCUMENTS

| 1224649 | 9/1966 | Fed. Rep. of Germany ... 425/DIG. 13 |
| 1483579 | 10/1969 | Fed. Rep. of Germany ...... 164/410 |
| 2264136 | 7/1973 | Fed. Rep. of Germany . |

Primary Examiner—Willard E. Hoag
Attorney, Agent, or Firm—Keil & Weinkauf

[57] ABSTRACT

A split mold for multi-component plastics, especially polyurethanes, with venting channels has heating devices in the zone of the said channels to prevent plastic from entering the channels and thus forming flash on the moldings.

4 Claims, 4 Drawing Figures

SPLIT MOLD FOR MULTI-COMPONENT PLASTICS, ESPECIALLY POLYURETHANES

The present invention relates to a split mold for multi-component plastics, especially polyurethanes, the mold having venting channels.

A mold of the said type is disclosed in German Published Application DAS No. 2,264,136; there, the venting channels are in the form of thin individual channels and are present in those zones of the mold cavity where air accumulates during mold filling or while the foam is rising. To be able to remove this air in a controlled manner the position of the venting channels must be adapted to the molding which is being produced. Frequently, however, the venting must be effected over a large surface in order to ensure removal of the air over wide zones of the molding, and this is difficult to achieve by means of thin individual channels.

A disadvantage of the known mold is that foam can exude through the vents. This then produces flash on the molding, which must subsequently be removed, entailing additional work. Moreover it is unavoidable that by cutting off the flash the molding is modified at the points in question, i.e. the closed skin of the foam is damaged. The porous foam under the skin becomes visible. This has and adverse effect both if in-mold coating is employed and if the moldings are subsequently surface-coated. Even in the case of uncoated moldings the damage to the foam skin is undesirable, since it can be felt and moreover the rough surface encourages soiling.

It is an object of the present invention to provide a mold for multi-component plastics which permits manufacture of moldings substantially without subsequent finishing of the latter and allows residual plastic in the venting channels to be removed easily.

We have found that this object is achieved by a mold as defined in the claims.

Because the venting channels can be heated, the reaction reate and/or foaming of the plastic can be accelerated in these zones of the mold. The spontaneous reaction of the plastic, triggered by a heat surge, results in an increase in viscosity and prevents entry of the plastics into the venting channels. Any foam which may be entrained by the air issuing from the mold cavity and thus passes into the venting channels can be vaporized if the channels are at an appropriately high temperature.

The heating device employed may use any system, such as high-frequency heating, induction heating or resistance heating, provided it can within a short time heat the zone of the venting channels to a sufficiently high temperature that the foam arriving there spontaneously reacts completely. Permanently heated venting zones can also be employed provided that they are so insulated from the mold cavity that the foam present in the latter is not damaged by the high temperatures in the venting zone.

FIGS. 1-4 of the drawing show illustrative embodiments of the invention in cross-section, which are discussed in more detail below.

In the mold shown in longitudinal section in FIG. 1, the upper mold half is marked 1 and the lower mold half is marked 4. The upper half is kept by means of spacers 2 in a defined position relative to the lower half. The mold cavity 5 is essentially formed in the lower half of the mold. Venting channels 6, running at an angle, are provided in the parting plane of the mold and these channels may be either annular or in the form of individual vents. An induction loop 3 heats the zone 7 of the venting channels which directly adjoins the mold cavity to a sufficiently high temperature that the plastic arriving there becomes fully polymerized and cannot penetrate into the venting channels. The induction loop is controlled as a function of time. Small amounts of foam which nevertheless pass into the vent are vaporized because of the temperature prevailing there. To avoid unintended heating of the actual mold contour surface, the heating surge is of limited duration.

Figure 2:
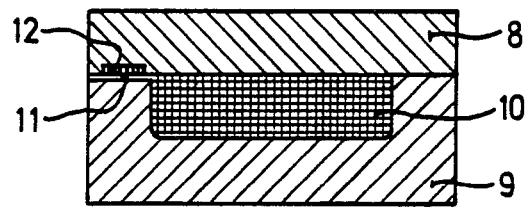

According to FIG. 2, the venting channels 11 of the mold are arranged horizontally between the upper mold half 8 and lower mold half 9. The lower half contains the mold cavity 10. The heating device 12 consists of two electrodes and a cuboid consisting of materials which can be heated by high frequency, for example materials having a low dielectric loss factor. In contrast, the mold itself is made from materials which do not respond to high-frequency heating. In this way, extraordinarily large amounts of heat can be generated very suddenly in the venting channels.

Figure 3:
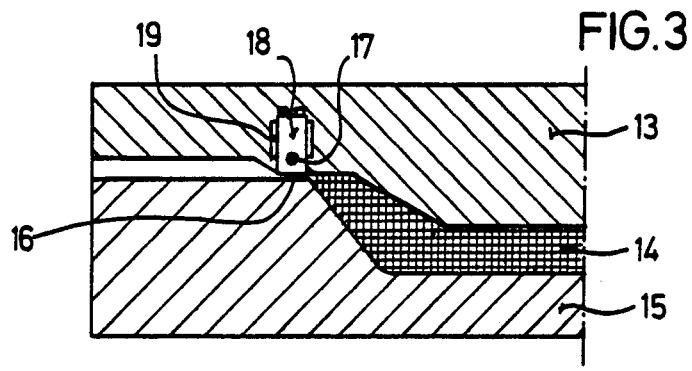

In the example in FIG. 3, an insert 18, provided with heating cartridges 17 or heater bands is fitted, in the zone of the venting channels 16, into the mold upper half 13 or lower half 15 in such a manner that the radiant surface of the insert faces the venting channels. To avoid undesirable heat transmission to the mold cavity 14, the heating device is insulated from the mold, or the heat transmission to the mold is greatly reduced by air gaps 19.

Figure 4:
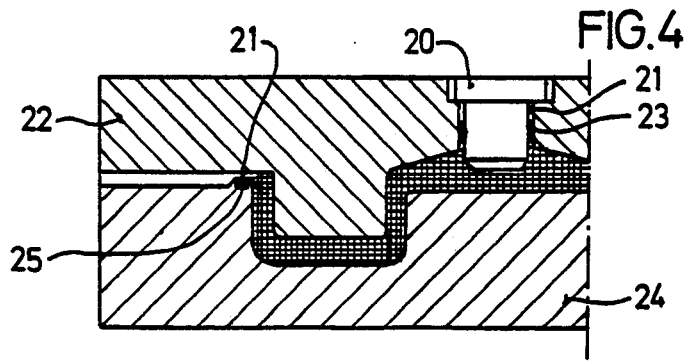

The mold shown in FIG. 4 possesses heating devices 23 and 25, for the venting channels 21, in both the upper mold half 22 and lower mold half 24. The heating device 23 is located on a ram 20 which is movable at right angles to the parting plane of the mold and which can also serve as a demolding aid. The ram is particularly suitable for forming heating surfaces, for example by vapor deposition of conductive material on the ram surfaces which face the venting channels 21.

Depending on the conditions in the mold, one or more of the above heating devices may be used for briefly heating the venting channels to a sufficiently high temperature that foam does not enter the channels and/or that foam present therein is vaporized by this high temperature.

We claim:

1. In a split mold for multi-component plastics, especially polyurethanes which react within the mold and which reaction may be accelerated by the application of heat, the mold having venting channels, the improvement comprising: heating means located only immediately adjacent some or all of the said channels said heating means briefly heating said channels to a sufficiently high temperature to accelerate reaction of said plastics whereby to prevent entry of said plastics into said channels.

2. A split mold as claimed in claim 1, wherein a heating device is provided on a ram protruding into the venting channel.

3. A split mold as claimed in claim 1, wherein the venting channels are partially or completely thermally insulated.

4. A split mold as claimed in claim 1, wherein the venting channels are angled.

* * * * *